Dec. 1, 1953
C. G. GORDON
2,661,166
AIRCRAFT FLAP MECHANISM
Filed Sept. 15, 1949
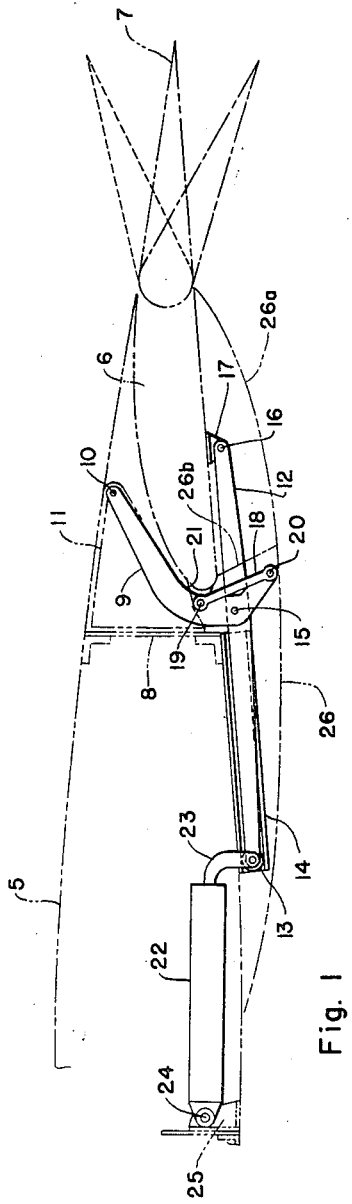
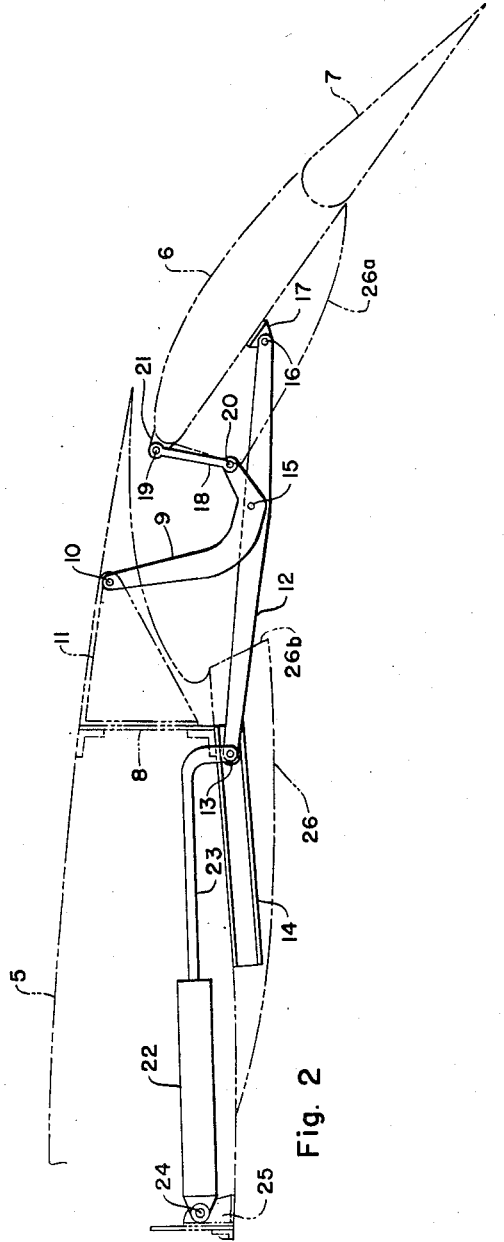
Carroll G. Gordon
*INVENTOR.*
BY James M. Oliver
HIS PATENT ATTORNEY.

Patented Dec. 1, 1953

2,661,166

UNITED STATES PATENT OFFICE 2,661,166

AIRCRAFT FLAP MECHANISM

Carroll G. Gordon, Pasadena, Calif., assignor to
North American Aviation, Inc.

Application September 15, 1949, Serial No. 115,835

10 Claims. (Cl. 244—42)

The present invention relates in general to aircraft wings and more particularly to the mounting and operating mechanism for flaps and other auxiliary surfaces adjustably associated with aircraft wings.

To facilitate the landing and take-off of aircraft, their wings are normally provided with trailing-edge flaps of various types for increasing the lift and drag characteristics of the wings to the desired extent for the particular flight condition. These trailing-edge flaps are usually of the slot-forming type in order to provide the most efficient air flow characteristics over the main wing or airfoil while the flaps are extended in their operative positions, and suitable operating mechanism, of an irreversible mechanical, hydraulic or electric type, under the control of the pilot through suitable control means, are provided for the positioning of the flaps with respect to the relatively fixed wing. In the retracted position of the flap and its supporting and operating mechanism, it is desirable that the flap forms a substantially streamlined continuation of the main wing and that the flap supporting and operating mechanism presents a minimum of interruption to the upper and lower surfaces of the wing profile.

In view of the constantly increasing speed requirements for which aircraft are being designed, and the concurrent increase in the need for suitable high-lift flap devices for landing and take-off conditions, together with the advent of increasingly thinner wing sections required for such higher flight speeds, numerous and important problems have been encountered in the arrangement for the satisfactorily rigid mounting and support of such flaps and the operating mechanism by which they may be suitably extended and retracted.

The present invention is directed to an improved and relatively simple pivotal type mounting and operating arrangement for trailing edge wing flaps which accomplishes the foregoing desirable objectives while avoiding the objectionable features of many prior efforts to provide solutions to these problems. A form of the mechanism comprising the present improvement is considerably more compact than many earlier mechanisms and accomplishes an efficient rearward projection and rotation of the flap surface through the optimum angles in association with a relatively thin wing and with the requirement of but a minimum of external fairing. The improved mechanism is such that the flight loads in each of the elements of the mechanism are maintained at relatively lower magnitudes than in most prior devices and are not subjected to rapid changes in these loads as a result of changes in the position of the flap. The present mechanism is equally well adapted for use with hydraulic, electrical, mechanical or other actuating systems and accomplishes a relatively long flap travel with good rigidity of the mechanism in all of its adjusted positions. The improved mechanism utilizes a compound link, which in a unique cooperative movement with a translatable beam element and a simple link member, supports the primary flap load and also controls the flap position about its pivotal support in the region of the center of the lift force exerted on the flaps.

The present invention is directed to further solutions of similar problems to which the subject matter of co-pending application Serial No. 793,866 filed December 26, 1947 has been directed, that application being the invention of the present applicant and Richard C. Dahlman.

It is, accordingly, a major object of the present invention to provide an improved support, or mounting, and operating mechanism for a trailing-edge flap or the like which is relatively simple in construction and arrangement and requires a minimum of external fairing of the wing and flap structures. It is a further object to provide such a mounting and operating mechanism which is unusually compact in arrangement and is particularly adapted for rigid operation in high speed aircraft having relatively thin wings. Another object resides in providing an operating mechanism for such trailing-edge flaps which is capable of efficiently extending and retracting the flaps while rotating the same into the most advantageous attitude at each position of flap extension. A further objective includes a flap mounting and operating mechanism in which the air loads in the respective elements of the assembly are maintained at relatively low values and are not subjected to extensive or rapid changes due to the various flap settings. It is also an object to provide a mounting and operating mechanism for trailing-edge flaps which mechanism is equally adapted for use with either hydraulic, electrical or mechanical actuating means. It is a still further object to provide such an arrangement which utilizes a bell-crank lever or compound link and a short straight guide means which concurrently support the primary flap loads and control the flap position about its pivotal support.

Other objects and advantages of the present invention will become apparent to those skilled in the art after a reading of the following description, taken in conjunction with the accompanying drawings forming a part hereof, in which:

Fig. 1 is a diagrammatic elevational view of the trailing edge of a wing showing a flap mounted thereon by a form of the present mounting and operating mechanism; and Fig. 2 is a similar diagrammatic view of the flap and mechanism in an extended position.

The numeral 5 represents the trailing portion of a relatively fixed wing or airfoil with which there is operatively associated the high-lift slot-forming flap 6, the trailing portion 7 of which may be pivotally mounted thereon and be provided for controlled movements with respect to the main flap 6. To the trailing-edge spar 8 there is suitably attached the rearwardly extending bracket fitting 11 to which the compound link or bell-crank arm 9 may be pivotally suspended from the pivot 10. The pivot 10 is disposed adjacent the upper surface of the wing 5 at an appreciable distance aft of the trailing-edge structural member 8 and accordingly forms one of the main points of flap support at which the reactions due to the flap loads are transmitted to the wing structure.

An elongated beam or link element 12 is provided at its forward terminal with a pivotally mounted roller 13 which is slidable along the rectilinear guide track 14 for the chordwise translation of the beam element 12. The rolling contact of the roller 13 with the guide track 14 accordingly provides a further and a movable point of support of the flap from the wing structure. The guide track 14, which may preferably be of channel cross-section, is fixedly attached adjacent the lower surface of the wing 5 to suitable internal wing structure and extends in the chordwise direction from substantially beneath the rear spar 8 to a point forward of the same.

The compound link or arm 9, which is in effect a bell-crank lever, is pivotally connected at 15 at an intermediate portion between its longer and shorter arm portions, to the elongated beam element 12 intermediate the fore and aft terminals of that element. The aft terminal of the beam member 12 is pivotally interconnected by the pivot 16 to the fitting 17 secured to the underside of the flap member 6 at approximately the center of the lift force exerted on the flap in its extended position. A simple interconnecting link 18 is pivotally connected to the pivot 19 on the fitting 21 attached to the leading edge of the flap 6 and is similarly attached to the terminal of the shorter arm of the bell-crank lever 9 by means of the pivot 20.

The actuating means for the foregoing mechanism comprises the fluid reciprocating piston-cylinder motor 22, having a piston arm portion 23 which is pivotally connected to the above-mentioned pivotally mounted roller 13 at the forward end of the beam element 12 within the track 14. The forward end of the actuating motor 22 is pivotally mounted by means of the pivot 24 upon the internal wing structure 25. From the retracted position, as shown in Fig. 1, the flap 6 is extended by actuation of the fluid motor 22 and rearward travel of its piston arm 23 and the connected roller 13. As the roller 13 is moved aft along the guide track 14, the beam or elongated link 12 is similarly bodily translated rearwardly with its forward terminal confined to the straight path determined by the guide track 14 and the engaging roller 13. The aft portion of the beam link 12, however, is suspended from the bell-crank lever 9 and its pivotal connection at 15 therewith will necessarily follow an arcuate path about the pivot 10 as a center. This movement of the beam link 12 is such that its aft pivotal connection 16 imparts a similar rearward and downward movement to the attached portion of the flap 6. Concurrently, while the pivotal support 16 of the flap is being moved rearwardly and downwardly, the rearward swinging of the bell-crank lever 9 about its pivot 10 as an axis causes unfolding, or a separating movement, of the lever 9 and the link 18 from the substantially nested or adjacent relationship of Fig. 1, to the opened arrangement shown in Fig. 2. As the shorter arm of the bell-crank lever 9, namely that between the pivots 15 and 20, is rotated in the counterclockwise direction upwardly and rearwardly about the pivot 15, the pivotally connected link 18 pushes the nose of the flap upwardly and somewhat rearwardly of the link pivot 20. These movements, which are imparted to the two separated portions of the flap 6, are accomplished progressively during the complete travel of the piston arm 23 or the corresponding travel of the roller 13 throughout the chordwise length of the guide track 14 and at each position the flap is rigidly retained while the slot between the leading edge of the flap and the trailing portion of the wing gradually increases to that shown in Fig. 2. The relatively shallow projection of the beam 12 and the track 14 may be protected by a fairing as indicated at 26. Part of this fairing is fixed to the wing structure while a part 26a is fixed to the flap structure with a mating line 26b. The lower forward portion of the fairing 26a is slotted in the chordwise direction to receive the aft portion of the beam 12 as the flap is lowered into its extended position as shown in Fig. 2.

It will, accordingly, be noted that the bell-crank lever or compound link 9 has three pivotal connections, one of which is solely for its suspension or support from the wing structure and the opposite pivot of which is solely for the support and positioning of the flap. The intermediate pivot of the compound link, through the intermediacy of the beam link 12, is both supported from the wing structure at this point and also serves to position and support the flap at this point. The bell-crank lever 9, accordingly, serves both for the support for the primary flap loads and also for controlling the angular position of the flap about its pivotal support at 16. It will be noted that the improved supporting mechanism supports the flap 6 by transmitting two main reactions to the wing at the pivotal connections 10 and 13 and transmits the forces from a support which is positioned close to the center of lift of the flap 6. The latter is prevented from rotating about its pivotal support 16 by the shorter arm of the bell-crank 9 and the simple link 18, which makes a rigid triangle between the pivots 16, 19 and 20 for a given flap position, but the mechanism changes this triangle as the flap position is changed thereby rigidly maintaining the flap at any given angle for all positions.

It will be also noted that with an upward and rearward lift force applied to the flap about its pivotal mounting 16, bending will be imposed upon the beam link 12 about its fulcrum 15 and an upward force transmitted to the pivot 10 on the wing structure by compression resisted by the longer arm portion of the bell-crank 9, while at the same time a downward reaction is applied to the track 14 at the pivot 18. Definite advantages are also obtained from the use of the relatively short, straight guide track portion 14, within which the possibilities of the rollers binding or jamming are minimized by its being a straight rather than a curved track.

The present invention permits the use of ailerons 7 with flaps 6 which may be full span. Ailerons 7 provide lateral control with aileron control mechanism (not shown) located in the main flap structure 6. The general arrangement of this invention obviates the use of space within the wing structure or flap structure, thereby allowing a lighter and stronger structure and more fuel space. In the operation of the invention the actuating mechanism 22 may be placed below the wing structure by increasing the size of the fairing slightly. Also, the flap mechanism may be operated by an actuating mechanism by rotating the link 9 about the pivot 10.

Other forms and modifications of the present invention, both with respect to its general arrangement and the details of its several parts, which may become obvious to those skilled in the art, after a reading of the foregoing specification in the light of the accompanying drawings, are all intended to come within the scope and spirit of the present invention, as more particularly defined in the appended claims.

I claim:

1. In aircraft, a relatively fixed wing having forward and trailing portions, a flap movably mounted upon the trailing portion of said wing, rectilinear guide means attached to said wing, a bell-crank lever pivotally suspended from said fixed wing, an elongated beam element extending fore and aft rearwardly in substantial alignment with said guide means and having a first terminal rollingly engageable with said guide means, the opposite terminal of said beam element pivotally attached adjacent the undersurface of said flap, an intermediate portion of said bell-crank lever pivotally attached to an intermediate portion of said beam element, link means pivotally interconnecting the leading edge of said flap with said bell-crank lever, and actuating means pivotally engaging said first terminal of said beam element for imparting rectilinear movement to said first terminal of said beam element along said guide means for the rearward and downward extension of said flap with respect to said wing trailing portion.

2. In aircraft wing construction, a wing, a flap supporting and operating mechanism comprising a flap pivotally mounted upon the trailing portion of said wing, a pivot connection in the region of the leading edge of said flap, a second flap pivot connection disposed at the undersurface of said flap in the region of its center of lift, a bell-crank lever pivotally connected at a first terminal to said wing, rectilinear guide means supported by said wing, a chordwise extending beam element having a terminal at its forward portion arranged for rectilinear sliding engagement of said forward terminal portion with said guide means, said beam element having its further terminal pivotally connected to said undersurface pivot on said flap, said bell-crank lever having an intermediate portion pivotally connected to an intermediate portion of said beam element, link means pivotally connecting the remaining terminal of said bell-crank lever with said flap leading edge pivot, and actuating means pivotally engaging said forward terminal portion of said beam element for moving said beam element for the rearward and downward extension of said flap with respect to the trailing portion of said wing.

3. In aircraft, a relatively fixed wing, a flap movably mounted upon the trailing portion of said wing, a pivotal connection at the leading edge of said flap, a further pivotal connection on said flap rearwardly of said leading edge and in the region of the undersurface of said flap, a bell-crank element pivotally connected at a terminal of a first of its arms to the trailing portion of said fixed wing, said bell-crank element having the terminal on the other of its arms pivotally interconnected by a link member with the said leading edge pivotal connection on said flap, an elongated chordwise extending link having a sliding pivotal connection at a first terminal and pivotally connected to the said undersurface pivot on said flap, an intermediate portion of said elongated link pivotally connected to an intermediate portion of said bell-crank member, and actuating means pivotally connected to said first terminal of said elongated link for extending said elongated link rearwardly with said first terminal guided rectilinearly with respect to said fixed wing by said sliding pivotal connection for the rearward and downward rotation of said flap.

4. In aircraft, a relatively fixed wing, a flap movably mounted upon the trailing edge thereof, a pair of pivotal connections carried by said flap spaced apart in both the vertical and chordwise direction of said flap, an elongated substantially horizontal chordwise extending link pivotally connected at its rearward terminal to the lower aftmost of said flap pivotal connections, an inclined bell-crank lever pivotally connected at a first terminal to said fixed wing and pivotally connected at an intermediate portion to an intermediate portion of said elongated link, chordwise extending guide means carried in the region of the undersurface of said fixed wing forward of the pivotal connection of said bell-crank lever, roller means carried by the forward terminal of said elongated link for rolling engagement with said guide means in a chordwise direction, said bell-crank lever having a further terminal portion extending rearwardly from its said pivotal interconnection to said elongated link, link means pivotally connected to the said rearwardly extending terminal of said bell-crank lever and to one of said flap pivotal connections, and actuating means in engagement with said elongated link for imparting rearward movement thereto with its forward terminal guided by said guide means for the rearward and downward extension of said flap with respect to said wing trailing edge.

5. In an aircraft, a wing having a trailing portion, a flap, a bell-crank lever pivotally mounted upon said trailing portion, rectilinear guide means disposed adjacent the undersurface of said wing spaced from the pivotal mounting of said bell-crank lever upon said wing trailing portion, an elongated beam element pivotally connected to said flap at a first terminal and pivotally constrained to move within said guide means at an opposite terminal, said bell-crank lever having a pivotal interconnection intermediate its said terminals with an intermediate portion of said beam element, a link pivotally connected to the leading edge of said flap and to the remaining terminal of said bell-crank lever, and actuating means operatively connected to said elongated beam element for moving said beam element and said bell-crank lever for the rearward and downward extension of said flap with respect to said wing trailing portion.

6. The combination with an aircraft wing having a relatively fixed wing structure, of a flap movably mounted upon the trailing portion of said wing, a bell-crank lever pivotally mounted at a terminal of a first of its arms upon said wing, an elongated beam element having a first terminal slidingly engageable with said fixed wing structure for chordwise movement of said first terminal of said beam element with respect thereto, said beam element having its opposite terminal pivotally attached to said flap, an intermediate portion of said bell-crank lever pivotally connected to an intermediate portion of said beam element, means operatively connected to said beam element for imparting rearward movement thereto, and a link pivotally connected to said flap and to the second arm of said bell-crank lever for positioning said flap about its pivotal support on said beam element as said flap is moved rearwardly and downwardly by rearward movement of said beam element and as said beam element is pivotally suspended by the first said arm of said bell-crank lever.

7. In an aircraft, a mounting arrangement for a flap beneath the trailing portion of a wing, comprising a wing, a flap, a bell-crank lever pivotally mounted at a first terminal upon the trailing portion of said wing, guide means carried by said wing, an elongated beam element pivotally connected at a first terminal to said flap and in engagement with said guide means at its opposite terminal, the intermediate portion of said bell-crank lever pivotally connected to an intermediate portion of said beam element, a link pivotally connected to the leading edge of said flap and to the remaining terminal of said bell-crank lever, and actuating means operatively connected to said beam element for extending said flap rearwardly into an operative position at which said flap is supported at positive angles of attack with respect to said wing.

8. In an aircraft, a construction for the mounting of a flap beneath the trailing portion of a wing, a two-arm lever member pivotally mounted at a first arm upon the trailing portion of said wing, guide means carried by said wing, a longitudinal beam element pivotally connected at a first terminal to said flap and engaged with said guide means at its opposite terminal, an intermediate portion of said bell-crank lever pivotally connected to said beam element, a link pivotally connected to the leading edge of said flap and to the remaining terminal of said two-arm lever, and actuating means pivotally engaging said opposite terminal of said beam element for extending said flap rearwardly from a retracted position faired beneath said wing into an operative position in which said flap is supported at a positive angle of attack with respect to said wing.

9. In an aircraft, a wing having a trailing portion, a flap, a bell-crank lever pivotally mounted at a first terminal upon the trailing portion of said wing, guide means carried by said wing, an elongated beam element pivotally connected at a first terminal to said flap and constrained to move along said guide means at its opposite terminal, an intermediate portion of said bell-crank lever pivotally connected to said beam element, a link pivotally connected to the leading edge of said flap and to the remaining terminal of said bell-crank lever, means engaging said beam element for the extension and retraction of said flap, said wing having a recess within its trailing portion into which said flap is faired in its retracted position, and fairing means carried by said wing and said flap for fairing exposed portions of said guide means, said bell-crank lever and said beam element.

10. A mounting mechanism for a flap faired beneath the trailing portion of an aircraft wing comprising a flap, a substantially vertically disposed link having an upper terminal pivotally connected to said flap, a substantially horizontal disposed link pivotally connected to said flap, means carried by said wing operatively connected to a forward portion of said horizontal link for guiding said link in a chordwise direction with respect to said wing, a vertically disposed suspension member having an upper portion pivotally supported from said wing, said member having an intermediate portion pivotally connected to an intermediate portion of said horizontal link, and actuating means operatively connected to said mounting mechanism for moving said flap rearwardly into an operative position in which said flap is rotated into a high angle of attack caused by the rotation of said suspension member about its said upper pivotal connection.

CARROLL G. GORDON.

References Cited in the file of this patent

UNITED STATES PATENTS

| Number | Name | Date |
|---|---|---|
| 2,086,085 | Lachmann et al. | July 6, 1937 |
| 2,375,610 | Allen | May 8, 1945 |